United States Patent
Burns et al.

(10) Patent No.: US 11,126,439 B2
(45) Date of Patent: Sep. 21, 2021

(54) SIMD OPERAND PERMUTATION WITH SELECTION FROM AMONG MULTIPLE REGISTERS

(71) Applicant: Apple Inc., Cupertino, CA (US)

(72) Inventors: Christopher A. Burns, Austin, TX (US); Liang-Kai Wang, Austin, TX (US); Robert D. Kenney, Austin, TX (US); Terence M. Potter, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/686,060

(22) Filed: Nov. 15, 2019

(65) Prior Publication Data

US 2021/0149679 A1  May 20, 2021

(51) Int. Cl.
| | |
|---|---|
| *G06F 15/80* | (2006.01) |
| *G06F 9/38* | (2018.01) |
| *G06T 1/60* | (2006.01) |
| *G06T 1/20* | (2006.01) |
| *G06F 9/30* | (2018.01) |

(52) U.S. Cl.
CPC ........ *G06F 9/3887* (2013.01); *G06F 9/30098* (2013.01); *G06T 1/20* (2013.01); *G06T 1/60* (2013.01)

(58) Field of Classification Search
CPC ...... G06F 9/3851; G06F 9/3887; G06F 9/383; G06F 15/8007; G06F 9/3016; G06F 9/38; G06F 9/3824; G06F 9/3832; G06F 9/30109; G06F 9/3009; G06T 1/20
See application file for complete search history.

(56) References Cited

U.S. PATENT DOCUMENTS

| | | |
|---|---|---|
| 6,272,616 B1 | 8/2001 | Fernando et al. |
| 6,643,763 B1 | 11/2003 | Starke et al. |
| 8,074,051 B2 | 12/2011 | Hokenek et al. |
| 8,248,422 B2 | 8/2012 | Mejdrich et al. |

(Continued)

OTHER PUBLICATIONS

International Search Report and Written Opinion in PCT Appl. No. PCT/US2020/060110 dated Feb. 25, 2021, 13 pages.

*Primary Examiner* — Hau H Nguyen
(74) *Attorney, Agent, or Firm* — Kowert, Hood, Munyon, Rankin & Goetzel, P.C.

(57) ABSTRACT

Techniques are disclosed relating to operand routing among SIMD pipelines. In some embodiments, an apparatus includes a set of multiple hardware pipelines configured to execute a single-instruction multiple-data (SIMD) instruction for multiple threads in parallel, wherein the instruction specifies first and second architectural registers. In some embodiments, the pipelines include execution circuitry configured to perform operations using one or more pipeline stages of the pipeline. In some embodiments, the pipelines include routing circuitry configured to select, based on the instruction, a first input operand for the execution circuitry from among: a value from the first architectural register from thread-specific storage for another pipeline and a value from the second architectural register from thread-specific storage for a thread assigned to another pipeline. In some embodiments, the routing circuitry may support a shift and fill instruction that facilitates storage of an arbitrary portion of a graphics frame in one or more registers.

20 Claims, 11 Drawing Sheets

(56) References Cited

U.S. PATENT DOCUMENTS

| | | |
|---|---|---|
| 9,389,869 B2 | 7/2016 | Tran |
| 9,672,043 B2 | 6/2017 | Eisen et al. |
| 9,830,156 B2 | 11/2017 | Krashinsky |
| 10,061,591 B2 | 8/2018 | Beylin et al. |
| 10,261,835 B2 | 4/2019 | Joao et al. |
| 10,296,333 B2 | 5/2019 | Rubinstein et al. |
| 2005/0286633 A1* | 12/2005 | Abel ................ H04N 19/61 375/240.16 |
| 2014/0122551 A1* | 5/2014 | Dogon ............... H03H 17/06 708/201 |
| 2017/0032488 A1 | 2/2017 | Nystad |
| 2018/0217844 A1* | 8/2018 | Kalamatianos ...... G06F 9/3887 |
| 2019/0199370 A1* | 6/2019 | Madduri ............. H03M 7/40 |

* cited by examiner

Example instruction format:
shff.[direction].[optional_mod] destination, shifted register, fill register, shift amount Destination d after instruction:

Example A:
shff.left d, R0, R1, #1

Example B:
shff.left d, R0, R1, #3

Example C:
shff.right d, R0, R1, #2

Example D:
shff.left.mod2 d, R0, R1, #1

Example E:
shff.left.mod4 d, R0, R1, #2

Register 1, Register 2, Register 3, Register 4 — each shown as a 4-column by 8-row grid numbered 0–31.

Register 7 after shift and fill of registers 5 and 6

SIMD OPERAND PERMUTATION WITH SELECTION FROM AMONG MULTIPLE REGISTERS

BACKGROUND

Technical Field

This disclosure relates generally to processor architecture and more particularly to circuitry configured to perform operand routing among single-instruction multiple-data (SIMD) pipelines.

Description of the Related Art

Many processors execute instructions using SIMD architectures (which may also be referred to as single instruction multiple thread (SIMT) architectures) in which a given operation is specified for a set of multiple threads that perform the operation on potentially different input data. Traditionally, private thread data was not shared among threads in SIMD architectures, e.g., each thread operates on its private operands and does not share data with other threads. Various computing algorithms may utilize neighborhood filter operations for a pixel that use values from nearby pixels as inputs. Obtaining the neighboring pixel data may use substantial amounts of processing resources in traditional SIMD implementations.

BRIEF DESCRIPTION OF THE DRAWINGS

FIGS. 3A-3B are diagrams illustrating example window manipulation within a two-dimensional frame of graphics data, according to some embodiments.

Figure 1:
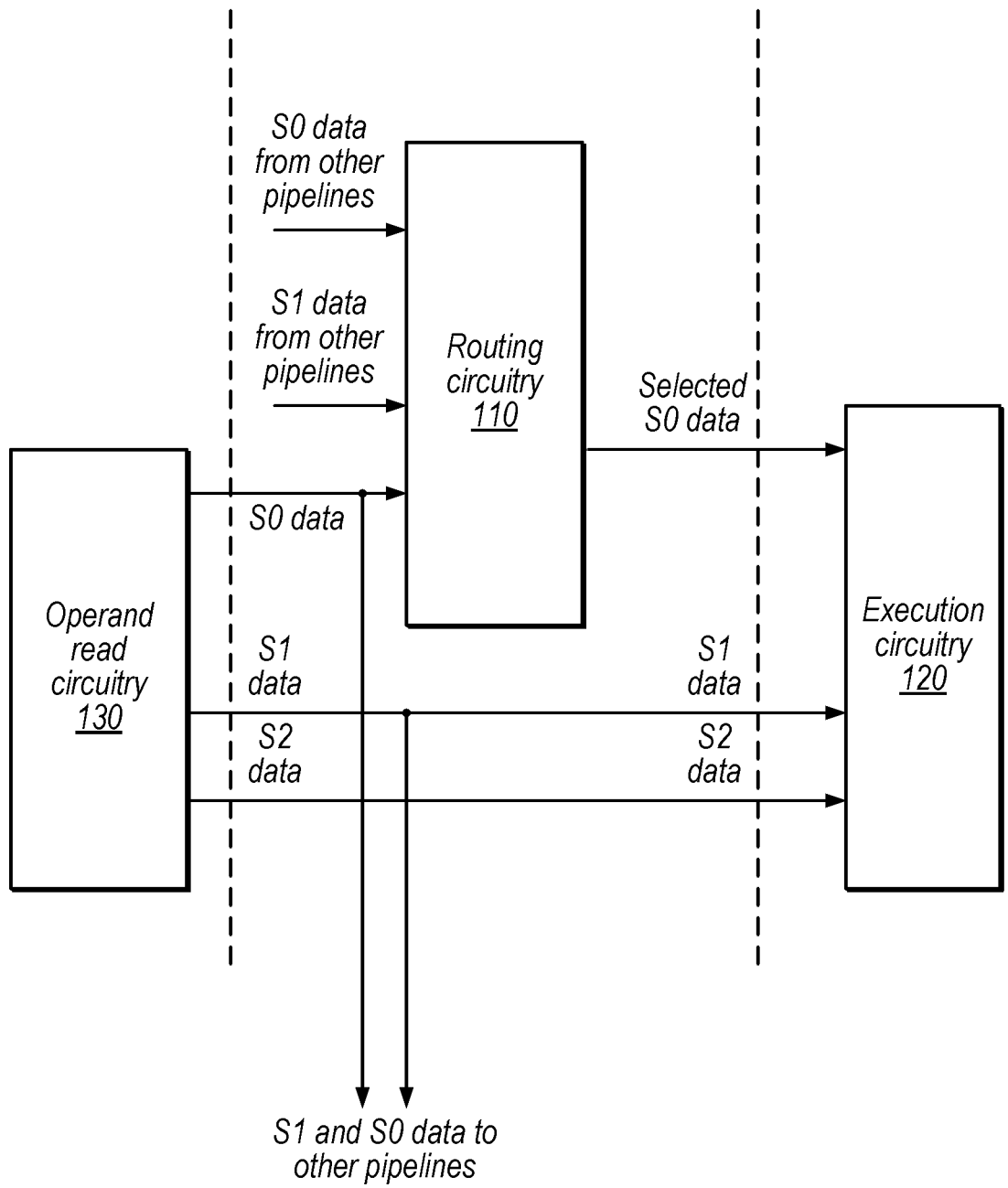
FIG. 1 is a block diagram illustrating an example pipeline with routing circuitry configured to select an input operand from operands from multiple architectural registers from other threads, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "multiplexer configured to select a value to output from among multiple inputs" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Overview of Routing Circuitry with Multiple Operand Inputs

Various types of computer processors may include sets of pipelines configured to execute SIMD instructions in parallel. For example, graphics processors often include programmable shader cores that are configured to execute instructions for a set of related threads in a SIMD fashion. In some embodiments, each thread is assigned to a hardware pipeline that fetches operands for that thread and performs the specified operations in parallel with other pipelines for the set of threads. The group of threads may be referred to as a SIMD group, a wavefront, a clique, or a warp, for example. Note that, in some embodiments, a larger set of threads in a thread group may be split into multiple SIMD groups. Each thread in the thread group may execute the same program, and threads in the same SIMD group may share a program counter while executing that program. Processors may have a large number of shader pipelines such that multiple separate SIMD groups may execute in parallel.

In some embodiments, each thread has private operand storage, e.g., in a register file. Thus, a read of a particular register from the register file may provide the version of the register for each thread in a SIMD group. Traditionally, each thread processed data from its thread-specific private storage, with limited sharing of data among threads, e.g., for gradient operations. More complex operand sharing, in traditional implementations, might require writes to shared memory before being able to process data from other threads. This may consume substantial power and affect performance for operations that use data for other threads. For example, different threads often operate on different pixels of a graphics frame or texture being processed, and convolution operations or neighborhood filtering operations may use data for nearby pixels (and thus from other threads' private operand storage).

In some embodiments, routing circuitry in SIMD pipelines is configured to provide operand data from thread-specific storage from one or more other threads in a SIMD group. This may improve performance or reduce power consumption for various mathematical operations in which sharing data among multiple threads is useful. In disclosed embodiments, for a given input operand for a thread, routing circuitry is configured to select from among multiple source operands from different threads. In various embodiments, this may facilitate convolution or other neighborhood filtering operations, as described in detail below. For example, different regions of a graphics frame may be stored in different registers. A shift and fill instruction that uses the routing circuitry to permute operand data from multiple registers across threads may be used to facilitate image filter and convolution operations.

FIG. 1 is a block diagram illustrating example pipeline stages, including a stage with routing circuitry that selects from among multiple architectural registers for an input operand, according to some embodiments. In the illustrated embodiment, the pipeline includes routing circuitry 110, execution circuitry 120, and operand read circuitry 130. In this example, each of these elements is included in a different pipeline stage (as indicated by the dashed lines), with routing circuitry 110 between an operand read stage and an execution stage, but this configuration is shown for purposes of illustration and is not intended to limit the scope of the present disclosure. Pipelines with various types, numbers, and ordering of stages may be implemented.

Operand read circuitry 130, in the illustrated embodiment, is configured to access operands in thread-specific storage for each thread. For example, an instruction may use architectural registers R0, R7, and R9 as input operands and operand read circuitry 130 may provide data from these registers as source operand data S0, S1, and S2, respectively. For the same SIMD instruction, other operand read circuits in other pipelines may similarly access and provide operand data. Note that in some embodiments, operand data may be stored in one or more operand caches between the register file and operand read circuitry 130 and operands may be accessed from other locations, e.g., as forwarded results from execution circuitry 120.

Execution circuitry 120, in the illustrated embodiment, is configured to perform one or more operations specified by an instruction. For example, execution unit 120 may be a fused multiply-add (FMA) unit configured to perform floating-point operations. As shown, execution circuitry 120 operates on operand data provided by operand read circuitry 130 and routing circuitry 110. Execution circuitry 120 may include multiple units configured to perform different types of operations.

Routing circuitry 110, in the illustrated embodiment, is configured to select from among multiple inputs to provide an S0 operand to execution circuitry 120. In particular, routing circuitry 110 receives S0 data from operand read circuitry 130 (for the thread assigned to the pipeline) and S0 data from other pipelines (e.g., from one or more other threads in the same SIMD group). Routing circuitry 110 also receives S1 data from one or more other pipelines. Note that various architectural registers may be assigned to S0 and S1 by a particular instruction. Thus, the disclosed routing circuitry 110 allows selection of an operand from another architectural register from another thread for S0 instead of the architectural register actually assigned to S0 for operand read circuitry 130. This may facilitate the "fill" portion of the shift and fill instruction discussed in detail below.

In some embodiments, when the execution circuitry 120 is performing operations using a certain precision (e.g., a 32-bit floating point format), the source from operand read circuitry 130 may be represented using another precision (e.g., a 16-bit floating point format). Therefore, in some embodiments one or more conversion circuits may be included in the pipeline before or after routing circuitry 110 to convert one or more operands for a given operation from a format that uses one precision to a format that uses another precision (or, more generally, from one format to another format). For example, the conversion circuitry may up-convert or clamp operand data to achieve a desired precision supported by the execution unit performing an instruction.

Note that, in the illustrated embodiment, the S1 data and S2 data provided by operand read circuitry 130 are also sent to other pipelines, e.g., for potential selection by routing circuitry of those other pipelines. The routing circuitry may be independently controlled for the different pipelines, in some embodiments.

Example Shift and Fill Instruction

Figure 2:
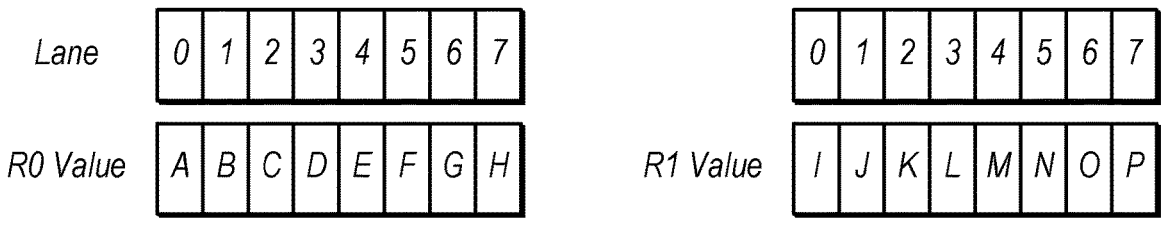
FIG. 2 is a diagram illustrating example operand routing for different example uses of a shift and fill instruction, according to some embodiments.
Figure 2:
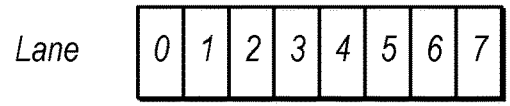
Figure 2:
Figure 2:
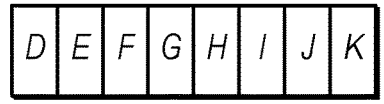
Figure 2:
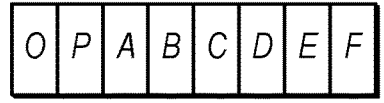
Figure 2:
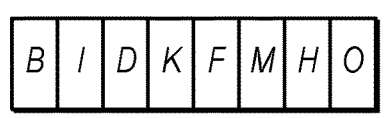
Figure 2:
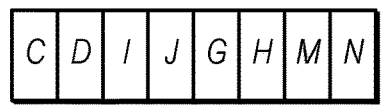

FIG. 2 is a diagram illustrating example operand selection for different examples of a shift and fill (shff) instruction, according to some embodiments. The illustrated instruction may utilize routing circuitry 110 to efficiently route operands from multiple architectural registers among threads of a SIMD group.

In the illustrated embodiment, the shift and fill instruction has the format "shff.direction.optional_mod destination, shifted register, fill register, shift amount." In this example, the direction indicates a right or left shift across SIMD lanes, the destination indicates a register to store the shifted results, and the shift amount (which may be stored in an indicated register or encoded in the instruction) indicates the number of places to shift. The optional_mod field may specify whether shifts are to occur within subsets of the SIMD group, as discussed in detail below. FIG. 2 shows example values in registers R0 and R1 for eight different threads/ lanes in a SIMD group (although similar techniques may be used with SIMD groups of various sizes). FIG. 2 also shows contents of a destination register d after various example shift and fill operations. Note that the destination may be the same as one of the source registers, in certain situations, although in other situations it may be desirable to retain source registers unchanged, e.g., for use in subsequent convolution operations when moving in one or more directions across a pixel space.

Note that, in some embodiments, the instruction may also specify an arithmetic operation (e.g., a fused multiply-add) and one or more additional operands, e.g., to be used as input operations to an arithmetic operation along with a shift and fill result. As one example, for an operations A*B+C, the shift and fill portion of the instruction may generate the A operand and the instruction may separately indicate the B and C operands. Further, although the disclosed examples implement shift and fill functionality for one operand, similar techniques may be used to select data for multiple operands of a math instruction. For example, referring back to FIG. 1, multiple instances of routing circuitry 110 may be implemented for a given thread to provide routing for S1 data or S2 data in addition to or in place of routing for S0 data.

In example A, the instruction "shff.left d, R0, R1, #1" shifts R0 operands to the left across threads in the SIMD group by one and fills in which a value ("I") from lane 0's R1.

In example B, the instruction "shff.left d, R0, R1, #3" shifts R0 operands to the left across threads in the SIMD group by three and fills in with values ("IJK") from R1 operands from lanes 0-2. In some embodiments, the shift amount is clamped to the size of the SIMD group, e.g., such that shifts equal than or greater to this simply propagate the values of R1 to the destination register in the same lanes they were stored in R1.

In example C, the instruction "shff.right d, R0, R1, #2" shifts the R0 operands to the right across threads in the SIMD group by two and fills in with values ("OP") from R1 operands from lanes 6-7. In this embodiment, shifts to the left fill from the left-hand side of the fill register while shifts to the right fill from the right-hand size of the fill register, but other implementations are contemplated.

In example D, the instruction "shff.left.mod2 d, R0, R1, #1" shifts R0 operands to the left among each subset of two threads in the SIMD group by 1. For example, for lanes 0 and 1, the "A" value is shifted out, the "B" value is shifted one to the left, and the "I" value is filled from lane 0's R1 operand. Similarly, for lanes 2 and 3, the "C" value is shifted out, the "D" value is shifted to the left, and the "K" value is shifted in from lane 2. In some embodiments, the "mod" field facilitates shifts in multiple dimensions in a multi-dimensional space such as a frame of pixel data, as discussed in detail below with reference to FIGS. 3A-4B.

In example E, the instruction "shff.left.mod4 d, R0, R1, #2" shifts R0 operands to the left among each subset of four threads in the SIMD group by 2. For example, for lanes 0-3, the "A" and "B" values are shifted out, the "C" and "D" values are shifted to the left by two, and the "I" and "J" values are filled from lanes 0 and 1's R1 operands.

As discussed above, in some embodiments, a shift and fill instruction may specify an arithmetic operation to be performed on the routed operands, e.g., using execution circuitry 120, particularly in embodiments where routing circuitry 110 is included in a pipeline stage between operand read circuitry 130 and execution circuitry 120. In other situations, a shift and fill instruction may rearrange operands from multiple architectural register among lanes without actually operating on the operands.

In some embodiments, the disclosed instructions may be exposed in an application programming interface (API). In other embodiments, the instructions may be internal micro-operations, but an API may include instructions that are mapped to such micro-operations. For example, an image-block_read API instruction may be used to move an arbitrary portion of a graphics frame into a particular register using multiple shift and fill instructions.

In some embodiments, a non-transitory computer-readable medium has instructions stored thereon that are executable by a computing device to perform operations comprising various operations discussed herein, e.g., with reference to shift and fill instructions. For example, the stored instructions may include a single-instruction multiple-data (SIMD) instruction that specifies first and second architectural registers and a shift amount across SIMD threads over which to shift values from the first register and fill in using values from the second register. The instruction may specify to select a value from a first architectural register for a first subset of threads of a SIMD group (which may be contiguous) and select a value from a second architectural register for a second subset of threads of the SIMD group (which may be also contiguous). Further, a program that includes one or more the disclosed shift and fill instructions may manipulate a multi-dimensional window of pixel data to perform various neighborhood filter techniques or convolution operations, as discussed in detail below. The instruction may specify shift and fill operations for multiple operands to be used as inputs to execution circuitry.

Example Window Manipulation Within a Frame of Graphics Data

Figure 3A:
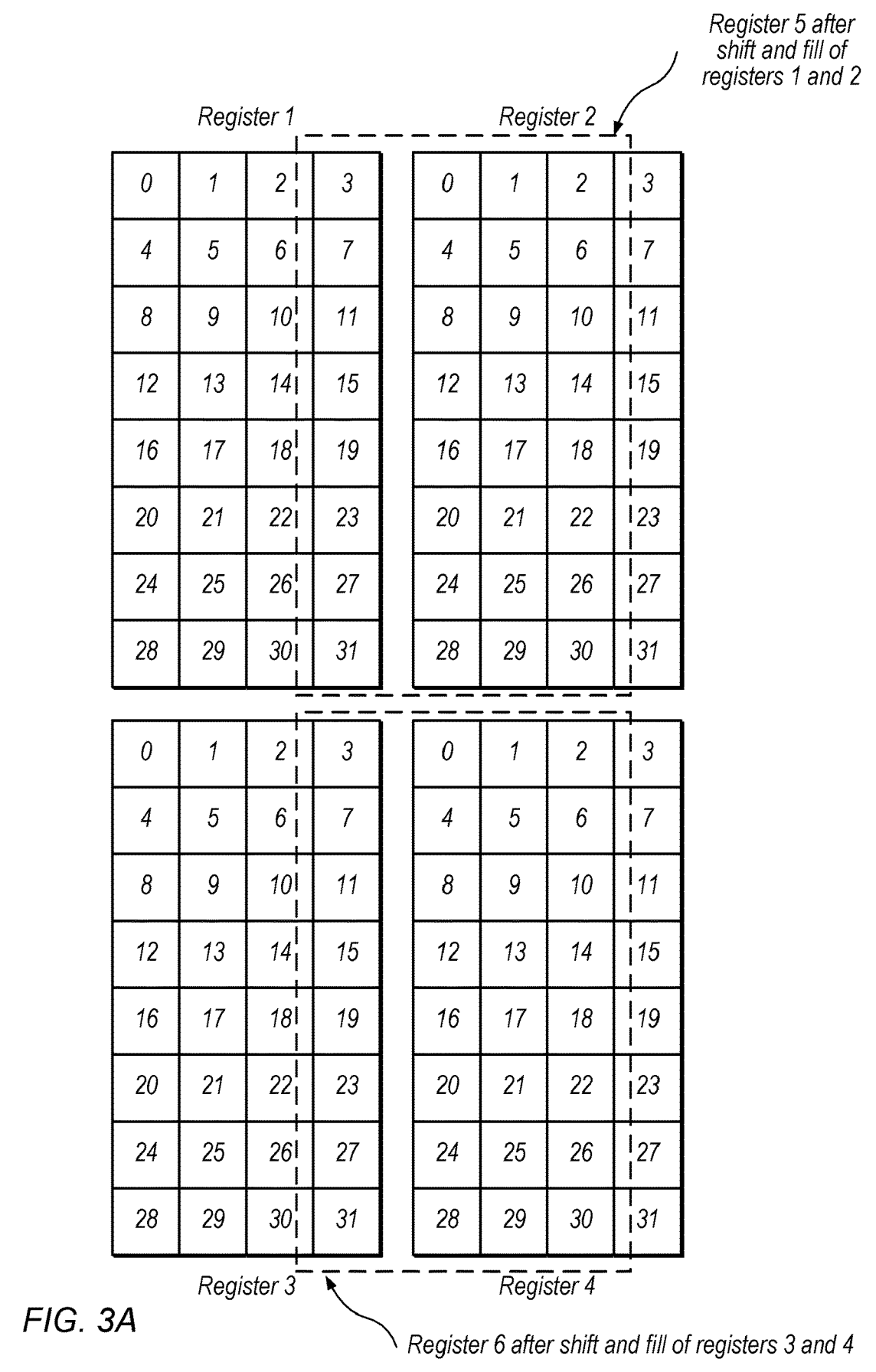

FIGS. 3A-3B are diagrams illustrating example window manipulation within a two-dimensional frame of graphics data, according to some embodiments. Note that disclosed techniques may be used with data structures with various numbers of dimensions, e.g., three-dimensional spaces and so on. In the illustrated example, data for 128 pixels is initially stored across four registers (registers 1-4), making up an eight by sixteen pixel portion of a graphics frame. In the illustrated example, a 32-thread SIMD group is used, with threads 0-31 each having a set of thread-specific registers. For example, thread 0 has a version of registers 1-4 in the illustrated example, thread 1 has a version of each of these registers, and so on. In various situations, neighbor filters (e.g., bilateral or polyphaser filters) or convolution operations may utilize data from various pixels in a graphics frame. The disclosed techniques may facilitate accumulation of relevant data in a particular register for threads of a SIMD group.

In FIG. 3A, a shift and fill instruction is used to populate register 5 (e.g., shff.left.mod4 R5, R1, R2, #3 or shffright-.mod4 R5, R2, R1, #1) and another instruction is similarly used to populate register 6 (e.g., shff.left.mod4 R6, R3, R4, #3 or shffright.mod4 R6, R4, R3, #1).

In FIG. 3B, a shift and fill instruction is used to populate register 7 (e.g., shff.left R7, R5, R6, #20 or shff.right R5, R2, R1, #12). Note that the shift amount for a vertical shift (when using the illustrated example distribution of pixel data across a register) is the row width (four in this example) times the desired shift amount in the vertical direction.

Using these techniques, shift and fill instructions may be used to populate a register with pixel data from any desired window from a frame of graphics data. For example, the window may center around one or more pixels for which neighborhood image filtering operations are being performed. In some embodiments, these techniques may advantageously increase performance when performing filtering based on nearby pixels or when performing convolution in one or more directions, for example.

Example Method

Figure 4:
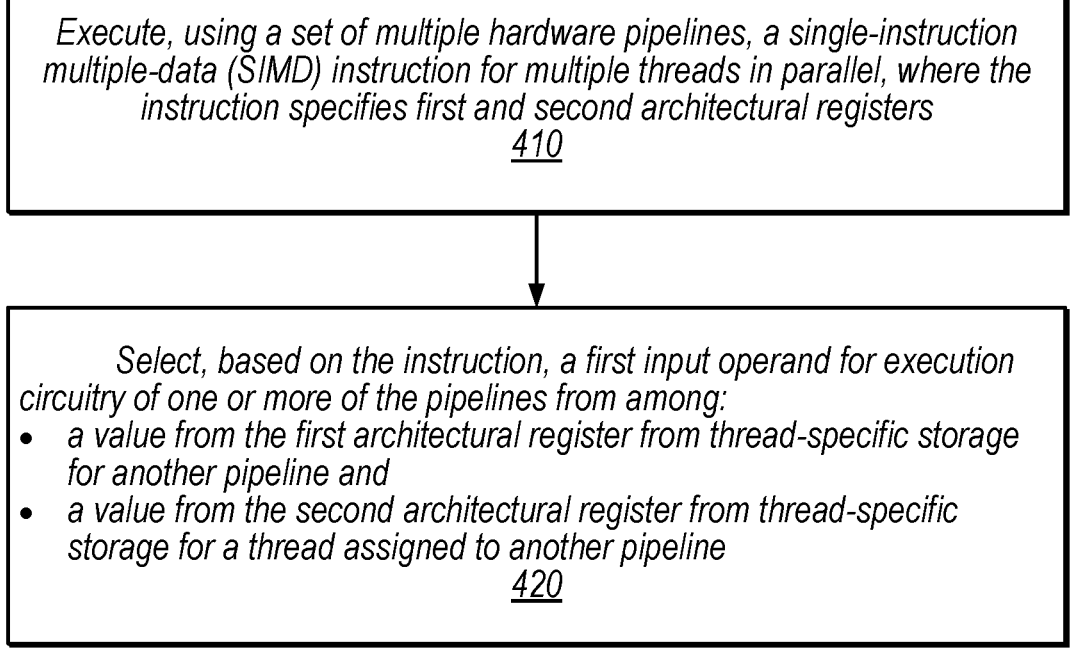
FIG. 4 is a flow diagram illustrating an example method for permuting operands among SIMD threads including selecting from among multiple registers to provide an input operand, according to some embodiments.

FIG. 4 is a flow diagram illustrating an example method for permutations among SIMD threads that select from among multiple registers to provide an input operand, according to some embodiments. The method shown in FIG. 4 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 410, in the illustrated embodiment, a device executes, using a set of multiple hardware pipelines, a single-instruction multiple-data (SIMD) instruction for multiple threads in parallel, where the instruction specifies first and second architectural registers.

For example, the instruction may be a shift and fill instruction. In these embodiments, routing circuitry may select a value from the first architectural register for a first subset of threads of a SIMD group (which may be contiguous, e.g., the threads that receive shifted operands) and select a value from the second architectural register for a second subset of threads of the SIMD group (which may be contiguous, e.g., the threads that receive filled operands). Note that similar techniques may be implemented for additional subsets, e.g., when the mod operator is used. In some embodiments, routing circuitry uses a multiplexer level (e.g., register selection circuitry 650 discussed in detail below) to select, for each thread, from between a value from the first architectural register and a value from the second architectural register.

At 420, in the illustrated embodiment, the device selects, based on the instruction, a first input operand for execution circuitry of one or more of the pipelines from among: a value from the first architectural register from thread-specific storage for another pipeline (e.g., the register being shifted across SIMD lanes) and a value from the second architectural register from thread-specific storage for a thread assigned to another pipeline (e.g., the register being used to fill). Note that the selection circuitry may also be configured to select a value from the first architectural register from thread-specific storage for the pipeline (rather than an operand from another pipeline), e.g., for other types of instructions that do not permute operands or for shift and fill instructions with a zero shift amount.

In some embodiments, the device executes a graphics program to store pixel data for a first portion of a graphics frame in the first architectural register and store pixel data for a second portion of a graphics frame in the second architectural register (e.g., registers 1 and 2 of FIG. 3A or registers 5 and 6 of FIG. 3B). In some embodiments, the device performs one or more shift and fill instructions to store part of the first portion of the graphics frame and part of the second portion of the graphics frame in a third architectural register. This may facilitate manipulation of a multi-dimensional window in a graphics space for neighborhood filtering operations or convolution operations.

Example Hierarchical Routing Circuitry

Figure 5A:
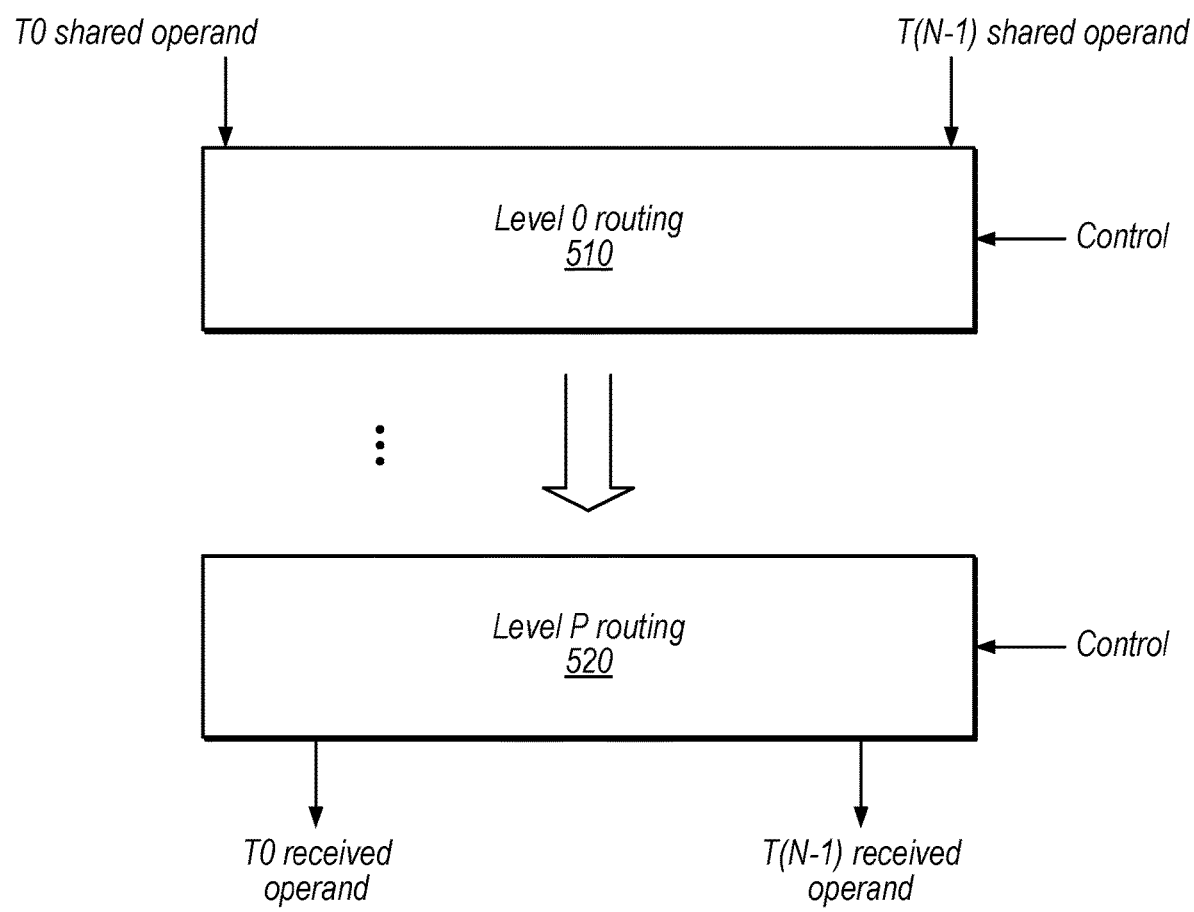
FIG. 5A is a block diagram illustrating example hierarchical routing circuitry, according to some embodiments.
Figure 5B:
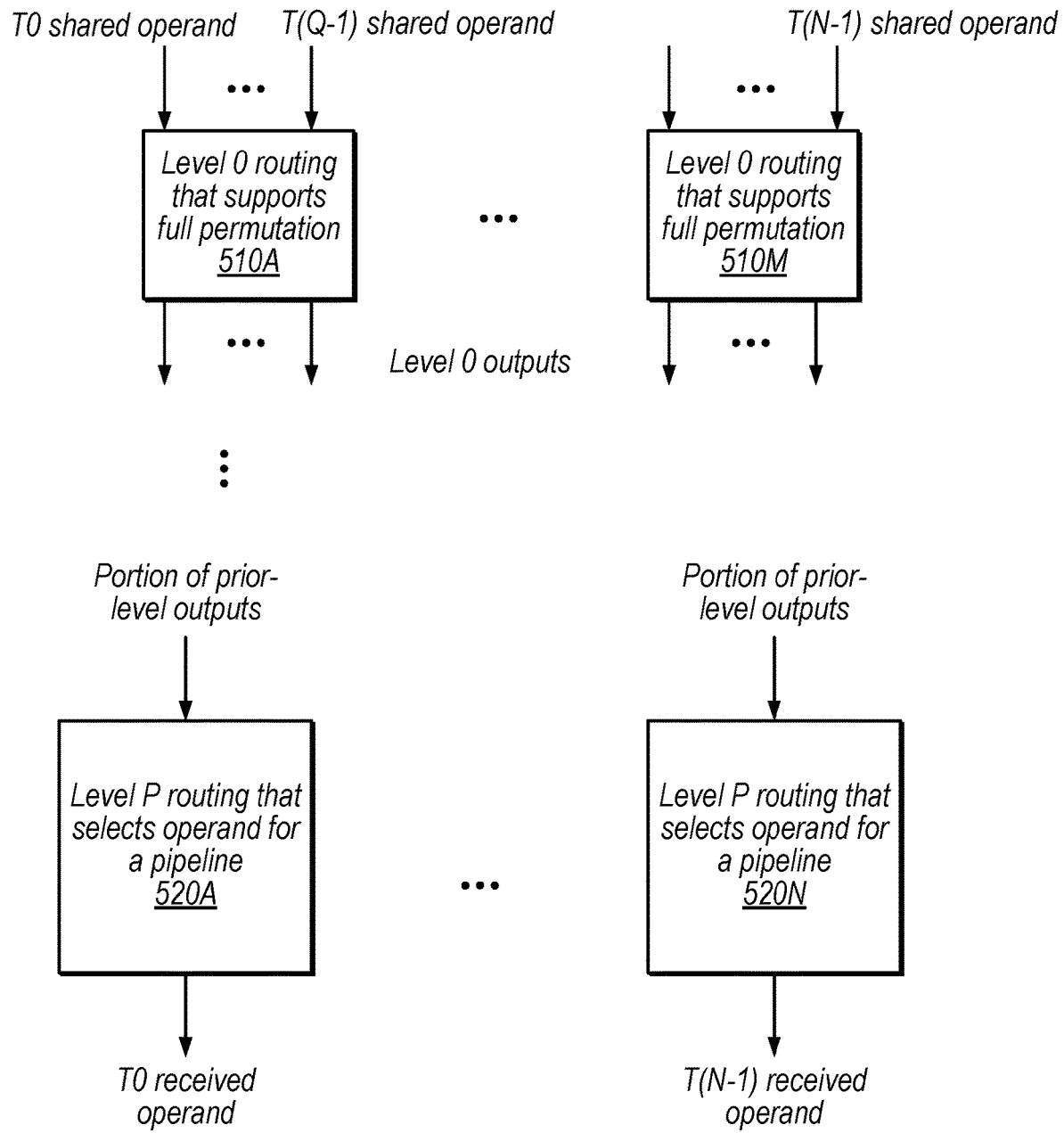
FIG. 5B is a block diagram illustrating multi-level routing circuitry that includes a level that supports full permutation among subsets of inputs and a selection level that selects outputs, according to some embodiments.
Figure 6:
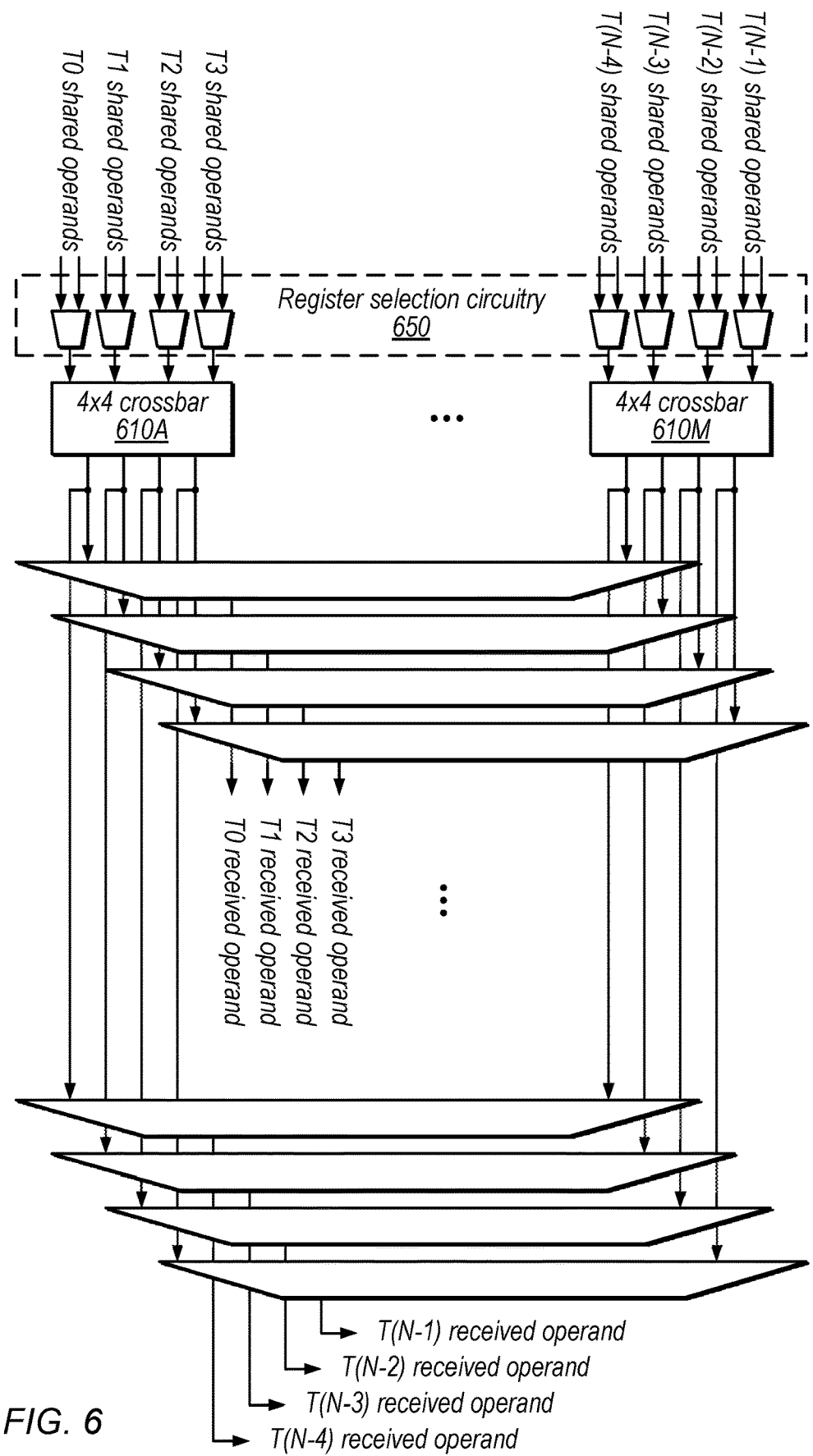
FIG. 6 is a block diagram illustrating a specific example of multi-level routing circuitry with register selection circuitry, according to some embodiments.

FIGS. 5A, 5B, and 6 are described below and provide examples of hierarchical routing circuitry that may be used for various routing operations discussed above. In some embodiments, routing circuitry 110 supports a subset of a full set of permutations and may be implemented using the circuitry of the following figures.

FIG. 5A is a block diagram illustrating example hierarchical routing circuitry, according to some embodiments. As shown, the routing circuitry may include any appropriate number of levels, including as few as two levels. In the illustrated example, the routing circuitry receives operands to be shared from N threads T0 through T(N−1) and outputs received operands for each of these threads.

In the illustrated embodiment, the routing circuitry includes P levels of routing circuitry, including level 0 510 and level P 520, which each receive respective control signals (e.g., based on the instruction being executed). In various embodiments, operands enter an input level of the routing circuitry and exit a final level of the routing circuitry. As used herein, a "prior" level of the routing circuitry refers to a level that is closer to the input level. For example, level 0 is the input level and is thus prior to level P in the illustrated embodiment. The level P routing elements 520, in the illustrated embodiment, output received operands for the N SIMD threads.

The routing circuitry of FIG. 5A may not support full permutations of inputs. One or more levels, however, may implement a full permutation within respective subsets of their input operands.

FIG. 5B is a block diagram illustrating multi-level routing circuitry that includes a level that supports full permutation among subsets of inputs and a selection level that selects outputs, according to some embodiments. FIG. 5B is one example of the circuitry of FIG. 5A. In the illustrated example, the level 0 routing circuitry 510 includes multiple elements 510A-510M that each support full permutation among a subset of the inputs to level 0. For example, circuit element 510A supports full permutation among threads T0 through T(Q−1). Note that, although shown as the input level in this example, a level that supports full permutation among subsets of inputs may be included at any appropriate level, in other embodiments. In some embodiments, each circuit element 510 has the same number of inputs and outputs.

The level P routing circuitry, in the illustrated example, includes a selection circuit element configured to select from a portion of the prior-level outputs (e.g., from level 0 or an intermediate level) to provide an operand for a particular thread. For example, selection element 520A receives a portion of the prior level outputs to select an operand for thread T0. As one example, elements 510 may be implemented using crossbars while elements 520 may be implemented using multiplexers, as discussed in detail below with reference to FIG. 6.

Example Two-Level Routing Circuitry

FIG. 6 is a block diagram illustrating a specific example of two-level routing circuitry, according to some embodiments. In the illustrated embodiment, routing circuitry includes 4×4 crossbars 610A-610M, register selection circuitry 650, and a multiplexer for each of the N threads. Similarly to FIGS. 5A and 5B, the illustrated routing circuitry is configured to receive operands for N threads and output operands for the N threads according to a specified permutation in a set of supported permutations.

Crossbar circuits 610, in the illustrated embodiment, are each configured to receive operands from a respective subset of pipelines to which a portion of the threads in a SIMD group are assigned and output the received operands based on a specified permute operation. In some embodiments, the crossbars 610 each support full permutation within their respective subset of operands. In some embodiments, the threads input to a given 4 ×4 crossbar are four threads that process a 2×2 quad of pixels. This may allow full permutation among operands for a given quad, in various embodiments. Note that in other embodiments, full crossbars may be configured to receive operands for subsets of threads with any of various numbers of threads, such as 8, 16, 32, etc.

Register selection circuitry 650, in the illustrated embodiment, is configured to select from among operands for at least two registers from each thread. For example, referring back to FIG. 1, a multiplexer may receive the S0 data and the S1 data from another pipeline and select from among these two operands. For shift and fill instructions, one portion of the illustrated multiplexers in register selection circuitry 650 may select a different input register than a second portion (e.g., where the first portion selects from the register being shifted and the second portion selects from the fill register).

The lower multiplexers, in the illustrated embodiment, are each configured to receive a particular output from all of the crossbars and select one of the crossbars to provide operands for their subset of the threads. For example, the multiplexer configured to select a received operand for thread T0 receives the left-most output from each of the M crossbars 610. Similarly, the multiplexer configured to select a received operand for thread T1 receives the second-to-the-left-most output from each of the M crossbars 610, and so on. Thus, each multiplexer receives only a portion of the outputs from the crossbar level of the routing circuitry (one output from each crossbar, in this example) and selects one of the outputs for its corresponding thread. Note that the multiplexers may be separately controlled based on the permutation operation being performed (control signals not explicitly shown).

For an example with a 16-thread SIMD group size, four 4×4 crossbars may be implemented and each of 16 multiplexers may receive four inputs. For an example with a 32-thread SIMD group size, eight 4×4 crossbars may be implemented and each of 32 multiplexers may receive eight inputs. For an example with a 64-thread group size, sixteen 4×4 crossbars may be implemented and each of 64 multiplexers may receive sixteen inputs. Note that the number of inputs per multiplexer may vary based on the size of the crossbars 610 as well, in some embodiments. Further, in some embodiments, later levels may receive subsets of operands from prior levels, where the subsets have any appropriate size. For example, in the example of FIG. 6, each MUX may receive two or more operands from each crossbar, which may increase circuit area relative to the illustrated example but may also increase the number of supported permutations in one pass through the routing circuitry. For at least certain SIMD group sizes, the routing circuitry of FIG. 6 supports full permutation within at most four passes through the routing circuitry. More generally, in some embodiments, the disclosed routing circuitry is configured to perform an arbitrary SIMD-wide shuffle in as many cycles as the number N of inputs to each element of the first level of the routing circuitry, e.g., by iterating across each numbered input to a given element at the first level over N cycles and then selecting the desired output value for a thread when it becomes available.

In some embodiments, the disclosed routing circuitry supports various permute operations using one pass through the routing circuitry (which may be performed in a single cycle). Examples of such operations include shift, rotate, broadcast, or butterfly operations. Shift operations may shift operands by a specified number of threads and may shift in a specified value such as zero or one into vacated threads (or values from a fill register, as discussed above). In some embodiments, uniform shift amounts among the threads may be expected. Rotate operations may similarly shift a specified number of threads but may wrap around values from other threads of the SIMD group. Broadcast operations may send an operand from one thread to multiple (or all) other threads in a SIMD group. Butterfly operations may mirror all or a portion of a SIMD group.

Graphics Processing Overview

Figure 7A:
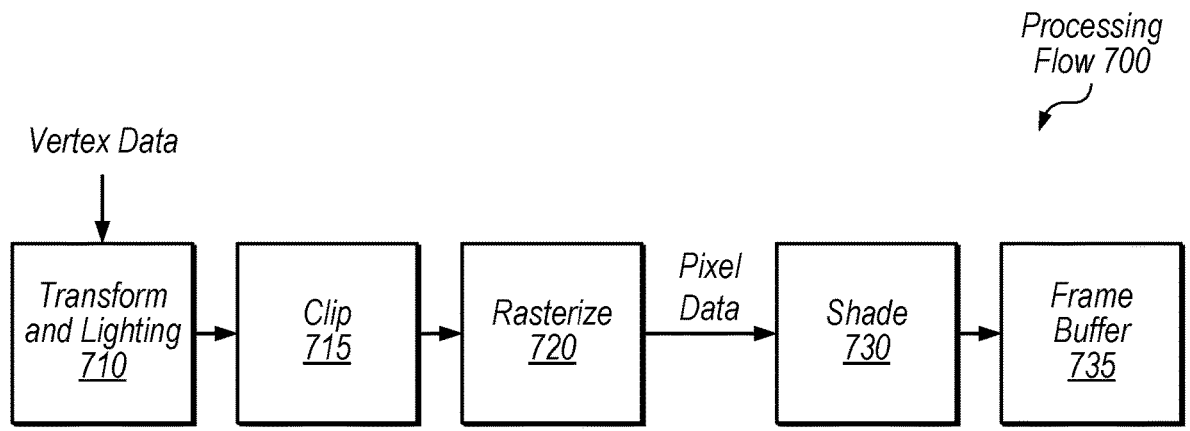
FIGS. 7A-7B illustrate an overview of a graphics processing flow and a graphics processor, according to some embodiments.

Referring to FIG. 7A, a flow diagram illustrating an example processing flow 700 for processing graphics data is shown. In some embodiments, transform and lighting step 710 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 715 may involve discarding polygons or vertices that fall outside of a viewable area. Rasterize step 720 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade step 730 may involve altering pixel components based on lighting, shadows, bump mapping, translucency, etc. Shaded pixels may be assembled in a frame buffer 735. Modern GPUs typically include programmable shaders that allow customization of shading and other processing steps by application developers. Thus, in various embodiments, the example elements of FIG. 7A may be performed in various orders, performed in parallel, or omitted. Additional processing steps may also be implemented.

Figure 7B:
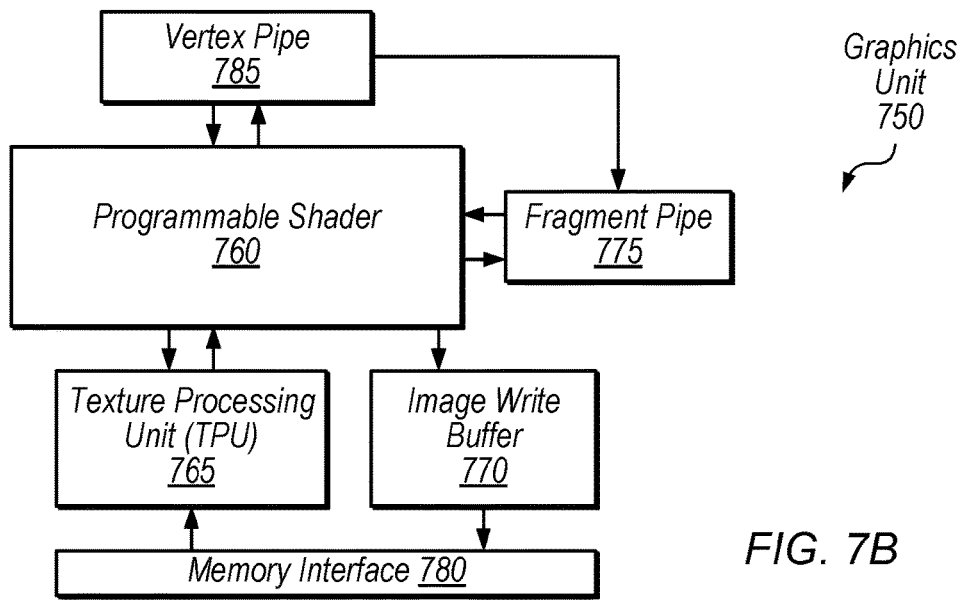

Referring now to FIG. 7B, a simplified block diagram illustrating a graphics unit 750 is shown, according to some embodiments. In the illustrated embodiment, graphics unit 750 includes programmable shader 760, vertex pipe 785, fragment pipe 775, texture processing unit (TPU) 765, image write unit 770, and memory interface 780. In some embodiments, graphics unit 750 is configured to process both vertex and fragment data using programmable shader 760, which may be configured to process graphics data in parallel using multiple execution pipelines or instances.

Vertex pipe 785, in the illustrated embodiment, may include various fixed-function hardware configured to process vertex data. Vertex pipe 785 may be configured to communicate with programmable shader 760 in order to coordinate vertex processing. In the illustrated embodiment, vertex pipe 785 is configured to send processed data to fragment pipe 775 and/or programmable shader 760 for further processing.

Fragment pipe 775, in the illustrated embodiment, may include various fixed-function hardware configured to process pixel data. Fragment pipe 775 may be configured to communicate with programmable shader 760 in order to coordinate fragment processing. Fragment pipe 775 may be configured to perform rasterization on polygons from vertex pipe 785 and/or programmable shader 760 to generate fragment data. Vertex pipe 785 and/or fragment pipe 775 may be coupled to memory interface 780 (coupling not shown) in order to access graphics data.

Programmable shader 760, in the illustrated embodiment, is configured to receive vertex data from vertex pipe 785 and fragment data from fragment pipe 775 and/or TPU 765. Programmable shader 760 may be configured to perform vertex processing tasks on vertex data which may include various transformations and/or adjustments of vertex data. Programmable shader 760, in the illustrated embodiment, is also configured to perform fragment processing tasks on pixel data such as texturing and shading, for example. Programmable shader 760 may include multiple execution pipelines for processing data in parallel, e.g., in a single-instruction multiple-data (SIMD) fashion as discussed herein.

TPU 765, in the illustrated embodiment, is configured to schedule fragment processing tasks from programmable shader 760. In some embodiments, TPU 765 is configured to pre-fetch texture data and assign initial colors to fragments for further processing by programmable shader 760 (e.g., via memory interface 780). TPU 765 may be configured to provide fragment components in normalized integer formats or floating-point formats, for example. In some embodiments, TPU 765 is configured to provide fragments in groups of four (a "fragment quad") in a 2×2 format to be processed by a group of four execution pipelines in programmable shader 760.

Image write unit (IWU) 770, in some embodiments, is configured to store processed tiles of an image and may perform operations to a rendered image before it is transferred for display or to memory for storage. In some embodiments, graphics unit 750 is configured to perform tile-based deferred rendering (TBDR). In tile-based rendering, different portions of the screen space (e.g., squares or rectangles of pixels) may be processed separately before being combined into a frame. Memory interface 780 may facilitate communications with one or more of various memory hierarchies in various embodiments.

Example Device

Figure 8:
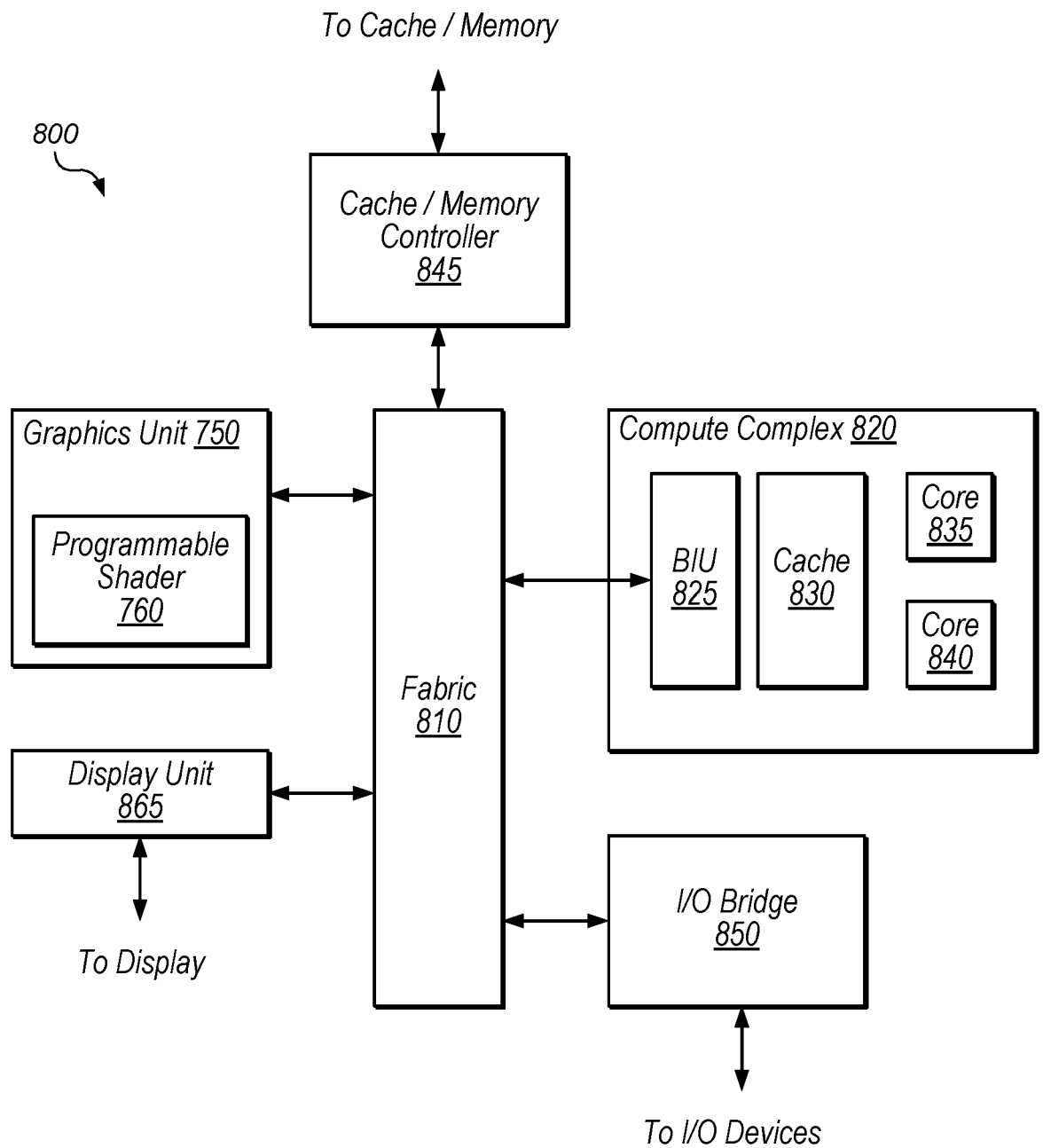
FIG. 8 is a block diagram illustrating an example computing device that may include SIMD pipelines, according to some embodiments.

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 750, and display unit 865. In some embodiments, device 800 may include other components (not shown) in addition to and/or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and/or caches. For example, compute complex 820 may include 1, 2, or 4 processor cores, or any other suitable number. In one embodiment, cache 830 is a set associative L2 cache. In some embodiments, cores 835 and/or 840 may include internal instruction and/or data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and/or memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 750 may be described as "coupled to" a memory through fabric 810 and cache/memory controller 845. In contrast, in the illustrated embodiment of FIG. 8, graphics unit 750 is "directly coupled" to fabric 810 because there are no intervening elements.

Graphics unit 750 may include one or more processors and/or one or more graphics processing units (GPU's). Graphics unit 750 may receive graphics-oriented instructions, such as OPENGL®, Metal, or DIRECT3D® instructions, for example. Graphics unit 750 may execute specialized GPU instructions or perform other operations based on the received graphics-oriented instructions. Graphics unit 750 may generally be configured to process large blocks of data in parallel and may build images in a frame buffer for output to a display. Graphics unit 750 may include transform, lighting, triangle, and/or rendering engines in one or more graphics processing pipelines. Graphics unit 750 may output pixel information for display images. Programmable shader 760, in various embodiments, may include highly parallel execution cores configured to execute graphics programs, which may include pixel tasks, vertex tasks, and compute tasks (which may or may not be graphics-related).

In some embodiments, programmable shader 760 includes the disclosed datapath and routing circuitry of FIG. 1. Programmable shader 760 may include multiple copies of the disclosed circuitry, e.g., for different sets of pipelines configured to process different SIMD groups. In other embodiments, the disclosed routing circuitry may be used in various other contexts, e.g., within a CPU core, a display unit, etc.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and/or low-power always-on functionality, for example. I/O bridge 850 may also include interfaces such as pulse-width modulation (PWM), general-purpose input/output (GPIO), serial peripheral interface (SPI), and/or inter-integrated circuit (I2C), for example. Various types of peripherals and devices may be coupled to device 800 via I/O bridge 850.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 9:
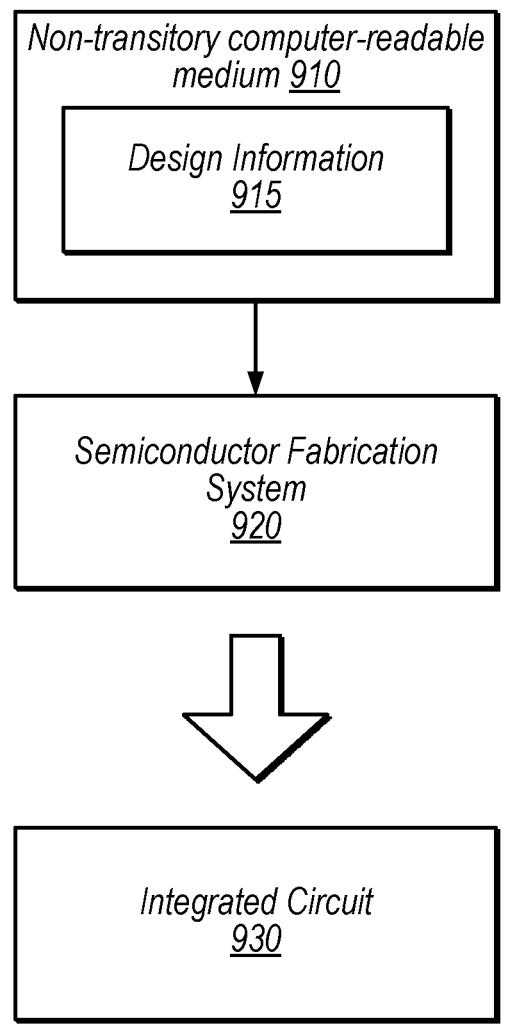
FIG. 9 is a block diagram illustrating an example computer-readable medium that stores circuit design information, according to some embodiments.

FIG. 9 is a block diagram illustrating an example non-transitory computer-readable storage medium that stores circuit design information, according to some embodiments. In the illustrated embodiment semiconductor fabrication system 920 is configured to process the design information 915 stored on non-transitory computer-readable medium 910 and fabricate integrated circuit 930 based on the design information 915.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Non-transitory computer-readable storage medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system 920. In some embodiments, design information 915 may also include one or more cell libraries which specify the synthesis and/or layout of integrated circuit 930. In some embodiments, the design information is specified in whole or in part in the form of a netlist that specifies cell library elements and their connectivity. Design information 915, taken alone, may or may not include sufficient information for fabrication of a corresponding integrated circuit. For example, design information 915 may specify the circuit elements to be fabricated but not their physical layout. In this case, design information 915 may need to be combined with layout information to actually fabricate the specified circuitry.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown in FIG. 1 or 5A-8. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    a set of multiple hardware pipelines configured to execute a single-instruction multiple-data (SIMD) instruction for multiple threads in parallel, wherein the instruction specifies first and second architectural registers, wherein respective hardware pipelines include:
        execution circuitry configured to perform operations, using one or more pipeline stages of the pipeline, on an operand for at least a first input operand position; and
        routing circuitry configured to select, based on the instruction, a first input operand for the first input operand position of the execution circuitry from among:

a value from the first architectural register from thread-specific storage for another pipeline; and a value from the second architectural register from thread-specific storage for a thread assigned to another pipeline;

wherein, for the first input operand position for the instruction, the routing circuitry is configured to select a value from the first architectural register for a first hardware pipeline and the second architectural register for a second hardware pipeline.

2. The apparatus of claim 1, wherein, for a shift and fill instruction, the routing circuitry is configured to select a value from the first architectural register for a first contiguous subset of threads of a SIMD group and select a value from the second architectural register for a second contiguous subset of threads of the SIMD group.

3. The apparatus of claim 1, wherein the routing circuitry includes a multiplexer level configured to select, for each thread, from between a value from the first architectural register and a value from the second architectural register.

4. The apparatus of claim 1, wherein the apparatus is configured to execute a graphics program to:
store pixel data for a first portion of a graphics frame in the first architectural register and store pixel data for a second portion of the graphics frame in the second architectural register; and
perform one or more shift and fill instructions to store part of the first portion of the graphics frame and part of the second portion of the graphics frame in a third architectural register.

5. The apparatus of claim 4, wherein the apparatus is further configured to execute the graphics program to perform one or more image filtering operations based on pixel data stored in the third architectural register.

6. The apparatus of claim 1, wherein the apparatus is configured to perform a convolution operation by moving a window in a graphics frame by executing multiple shift and fill instructions.

7. The apparatus of claim 1, wherein the routing circuitry is included in a pipeline stage between operand read circuitry and the execution circuitry.

8. The apparatus of claim 1, further comprising conversion circuitry configured to convert the first input operand from a first format having a first precision to a second format having a different precision.

9. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
a set of multiple hardware pipelines configured to execute a single-instruction multiple-data (SIMD) instruction for multiple threads in parallel, wherein the instruction specifies first and second architectural registers, wherein respective hardware pipelines include:
execution circuitry configured to perform operations, using one or more pipeline stages of the pipeline, on an operand for least a first input operand position; and
routing circuitry configured to select, based on the instruction, a first input operand for the first input operand position of the execution circuitry from among:
a value from the first architectural register from thread-specific storage for another pipeline; and a value from the second architectural register from thread-specific storage for a thread assigned to another pipeline;

wherein, for the first input operand position for the instruction, the routing circuitry is configured to select a value from the first architectural register for a first hardware pipeline and the second architectural register for a second hardware pipeline.

10. The non-transitory computer readable storage medium of claim 9, wherein, for a shift and fill instruction, the routing circuitry is configured to select a value from the first architectural register for a first contiguous subset of threads of a SIMD group and select a value from the second architectural register for a second contiguous subset of threads of the SIMD group.

11. The non-transitory computer readable storage medium of claim 9, wherein the routing circuitry includes a multiplexer level configured to select, for each thread, from between a value from the first architectural register and a value from the second architectural register.

12. The non-transitory computer readable storage medium of claim 9, wherein the circuit is configured to execute a graphics program to:
store pixel data for a first portion of a graphics frame in the first architectural register and store pixel data for a second portion of the graphics frame in the second architectural register; and
perform one or more shift and fill instructions to store part of the first portion of the graphics frame and part of the second portion of the graphics frame in a third architectural register.

13. The non-transitory computer readable storage medium of claim 12, wherein the circuit is further configured to execute the graphics program to perform one or more neighborhood filtering operations based on pixel data stored in the third architectural register.

14. The non-transitory computer readable storage medium of claim 9, wherein the routing circuitry is further configured to select the first input operand for the execution circuitry from:
a value from the first architectural register from thread-specific storage for the pipeline.

15. A method, comprising:
executing, using a set of multiple hardware pipelines, a single-instruction multiple-data (SIMD) instruction for multiple threads in parallel, wherein the instruction specifies first and second architectural registers;
selecting, based on the instruction, a first input operand for a first input operand position of execution circuitry of one or more of the pipelines from among:
a value from the first architectural register from thread-specific storage for another pipeline; and
a value from the second architectural register from thread-specific storage for a thread assigned to another pipeline
wherein, for the first input operand position for the instruction, the selecting selects a value from the first architectural register for a first hardware pipeline and selects the second architectural register for a second hardware pipeline.

16. The method of claim 15, further comprising:
in response to a shift and fill instruction, selecting a value from the first architectural register for a first contiguous subset of threads of a SIMD group and select a value from the second architectural register for a second contiguous subset of threads of the SIMD group.

17. The method of claim 15, further comprising:
selecting, by multiplexer circuitry for each thread, from between a value from the first architectural register and a value from the second architectural register.

18. The method of claim 15, further comprising:
executing a graphics program to:
- store pixel data for a first portion of a graphics frame in the first architectural register and store pixel data for a second portion of the graphics frame in the second architectural register; and
- perform one or more shift and fill instructions to store part of the first portion of the graphics frame and part of the second portion of the graphics frame in a third architectural register.

19. The method of claim 18, further comprising:
performing one or more image filtering operations based on pixel data stored in the third architectural register.

20. The method of claim 15, further comprising:
performing a convolution operation by moving a window in a graphics frame by executing multiple shift and fill instructions.

\* \* \* \* \*